(12) United States Patent
Lev et al.

(10) Patent No.: US 11,394,698 B2
(45) Date of Patent: Jul. 19, 2022

(54) MULTI-PARTY COMPUTATION (MPC) BASED AUTHORIZATION

(71) Applicant: NEC Corporation Of America, Herzlia (IL)

(72) Inventors: Tsvi Lev, Tel-Aviv (IL); Yaacov Hoch, Ramat-Gan (IL)

(73) Assignee: NEC Corporation Of America, Herzlia (IL)

( * ) Notice: Subject to any disclaimer, the term of this patent is extended or adjusted under 35 U.S.C. 154(b) by 44 days.

(21) Appl. No.: 16/941,616

(22) Filed: Jul. 29, 2020

(65) Prior Publication Data
US 2022/0038442 A1 Feb. 3, 2022

(51) Int. Cl.
| H04L 29/06 | (2006.01) |
| H04L 9/40 | (2022.01) |
| G06F 21/31 | (2013.01) |
| G06F 21/62 | (2013.01) |
| G06F 21/78 | (2013.01) |

(52) U.S. Cl.
CPC .......... H04L 63/0442 (2013.01); G06F 21/31 (2013.01); G06F 21/6218 (2013.01); G06F 21/78 (2013.01); H04L 63/102 (2013.01); H04L 63/105 (2013.01)

(58) Field of Classification Search
CPC . H04L 63/0442; H04L 63/102; H04L 63/105; G06F 21/31; G06F 21/6218; G06F 21/78
See application file for complete search history.

(56) References Cited

U.S. PATENT DOCUMENTS

| 2015/0244522 | A1* | 8/2015 | Cheruvath | G06F 21/31 |
| | | | | 713/183 |
| 2015/0349958 | A1* | 12/2015 | Lindell | G06F 21/62 |
| | | | | 713/168 |
| 2018/0375653 | A1* | 12/2018 | Setty | H04L 9/3218 |
| 2019/0214022 | A1* | 7/2019 | Vaquero Avilés-Casco | ............... |
| | | | | G10L 17/00 |
| 2019/0372765 | A1* | 12/2019 | Tegeder | H04L 9/0825 |
| 2021/0167946 | A1* | 6/2021 | Bitan | H04L 9/085 |
| 2021/0391983 | A1* | 12/2021 | Will | H04L 9/0643 |

* cited by examiner

*Primary Examiner* — Joseph P Hirl
*Assistant Examiner* — Chi D Nguy

(57) ABSTRACT

Provided herein are system, devices and methods for applying Multi-Party Computation (MPC) to authenticate a user accessing a secure resource using a plurality of computing nodes. The computing nodes, each receiving a respective one of a plurality of encrypted shares created using a plurality of keys to encrypt private data captured by a client device used by the user accessing the secure resource, engage in a secure MPC to compare between the encrypted shares and reference encrypted private data copies also encrypted using the plurality of keys without decrypting the private data since the keys are not available to the computing nodes. The computing nodes compute a match score based on the comparison and transmit it to a controller of the secure resource configured to grant or deny the client device access to the secure resource based on the match score.

15 Claims, 3 Drawing Sheets

MULTI-PARTY COMPUTATION (MPC) BASED AUTHORIZATION

FIELD AND BACKGROUND OF THE INVENTION

The present invention, in some embodiments thereof, relates to authenticating a user accessing a secure resource data, and, more specifically, but not exclusively, to authenticating private data of a user accessing a secure resource data by a plurality of computing nodes engaged in a Multi-Party Computation (MPC) using an encrypted version of the private data and having no access to the private data content in the clear (unencrypted).

Online services already dominate many aspects of modern life including government services, workplace services, banking and financial services, online shopping platforms, social, gaming and leisure applications to name just a few.

Most if not all of the online services may include access to secure resources comprising sensitive, private and/or confidential information. Access to the secure resources may therefore be user oriented, controlled on user basis such that users may be associated with respective accounts, capabilities, access rights, privileges and/or the like.

In order to allow the users access to the secure resources and apply their respective access rights, the users must be first authenticated to verify that each user is who he claims to be. Authenticating the users is typically done based on matching private data, for example, access credentials provided by the users against reference private data comprising private data of the users authorized to access the secure resource.

SUMMARY OF THE INVENTION

According to a first aspect of the present invention there is provided a system for applying MPC to authenticate a user accessing a secure resource, comprising a plurality of computing nodes configured to:

Receive, via one or more networks, a plurality of encrypted shares each created using a respective one of a plurality of keys to encrypt private data captured by a client device used by a user for accessing a secure resource. Each of the plurality of computing nodes receives a respective one of the plurality of encrypted shares. The private data comprising data relating to the user and/or the client device.

Engage in a secure MPC to compare between the encrypted shares and a plurality of reference encrypted private data copies which are each encrypted using a respective one of the plurality of keys and associated with a respective one of the plurality of computing nodes. The plurality of keys are not available to the computing nodes.

Compute a match score based on the comparison,

Transmit the match score to a controller of the secure resource configured to grant or deny access of the client device to the secure resource based on the match score.

According to a first aspect of the present invention there is provided a method of applying MPC to authenticate a user accessing a secure resource, comprising using a plurality of computing nodes configured for:

Receiving, via one or more networks, a plurality of encrypted shares each created using a respective one of a plurality of keys to encrypt private data captured by a client device used by a user for accessing a secure resource. Each of the plurality of computing nodes receives a respective one of the plurality of encrypted shares. The private data comprising data relating to the user and/or the client device.

Engaging in a secure MPC to compare between the encrypted shares and a plurality of reference encrypted private data copies which are each encrypted using a respective one of the plurality of keys and associated with a respective one of the plurality of computing nodes. The plurality of keys are not available to the computing nodes.

Computing a match score based on the comparison,

Transmitting the match score to a controller of the secure resource configured to grant or deny access of the client device to the secure resource based on the match score.

According to a third aspect of the present invention there is provided a client device for applying Multi-Party Computation (MPC) to authenticate a user accessing a secure resource, comprising one or more processors of a client device used by a user for accessing a secure resource, the one or more processors are configured to execute a code, the code comprising:

Code instructions to capture private data comprising data relating to the user and/or the client device.

Code instructions to create a plurality of encrypted shares each created using a respective one of a plurality of keys to encrypt the captured private data.

Code instructions to transmit, via ta least one network, the plurality of encrypted shares to a plurality of computing nodes which engage in a secure MPC to compare between the encrypted shares and a plurality of reference private data copies and compute a match score based on the comparison. Each of the plurality of reference private data copies is encrypted using a respective one of the plurality of keys and associated with a respective one of the plurality of computing nodes. A controller of the secure resource is configured to grant or deny the client device access to the secure resource based on the match score.

According to a fourth aspect of the present invention there is provided a method of applying MPC to authenticate a user accessing a secure resource, comprising using one or more processors of a client device used by a user for accessing a secure resource. The one or more processors are used for:

Capturing private data comprising data relating to the user and/or the client device.

Creating a plurality of encrypted shares each created using a respective one of a plurality of keys to encrypt the captured private data.

Transmitting, via ta least one network, the plurality of encrypted shares to a plurality of computing nodes which engage in a secure MPC to compare between the encrypted shares and a plurality of reference private data copies and compute a match score based on the comparison. Each of the plurality of reference private data copies is encrypted using a respective one of the plurality of keys and associated with a respective one of the plurality of computing nodes. A controller of the secure resource is configured to grant or deny the client device access to the secure resource based on the match score.

In an optional implementation form of the first, second, third and/or fourth aspects, the controller of the secure resource is configured to grant or deny access of the client device to the secure resource based on comparison of the match score to one or more thresholds.

In an optional implementation form of the first, second, third and/or fourth aspects, the controller of the secure resource is configured to adjust access rights of the client device to the secure resource according to the match score.

In an optional implementation form of the first, second, third and/or fourth aspects, a master computing node of the plurality of computing nodes transmits to the client device a data request instructing the client device to respond with one or more private data items defined by the data request.

In an optional implementation form of the first, second, third and/or fourth aspects, in case the match score does not exceed one or more thresholds, an additional information request is transmitted to the client device instructing the client device to respond with one or more additional private data items.

In a further implementation form of the first, second, third and/or fourth aspects, the private data relating to the user comprises authentication data of the user.

In a further implementation form of the first, second, third and/or fourth aspects, the private data relating to the client device comprises one or more attributes of a structure of the client device, the structure comprising one or more member of a group consisting of: a hardware structure, a software structure and a storage structure.

In a further implementation form of the first, second, third and/or fourth aspects, the secure resource is a networked resource of a private network accessible from a plurality of different geographical regions, wherein the plurality of computing nodes configured to compute the match score used to authorize access of the client device to the private network are computing nodes associated with the private network.

In a further implementation form of the first, second, third and/or fourth aspects, the secure resource is a cryptocurrency service, wherein the plurality of computing nodes configured to compute the match score used to authorize access of the client device to the to the cryptocurrency service are computing nodes associated with one or more financial services.

In an optional implementation form of the first, second, third and/or fourth aspects, the client device discards the plurality of encrypted shares after transmitted to the plurality of computing nodes.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
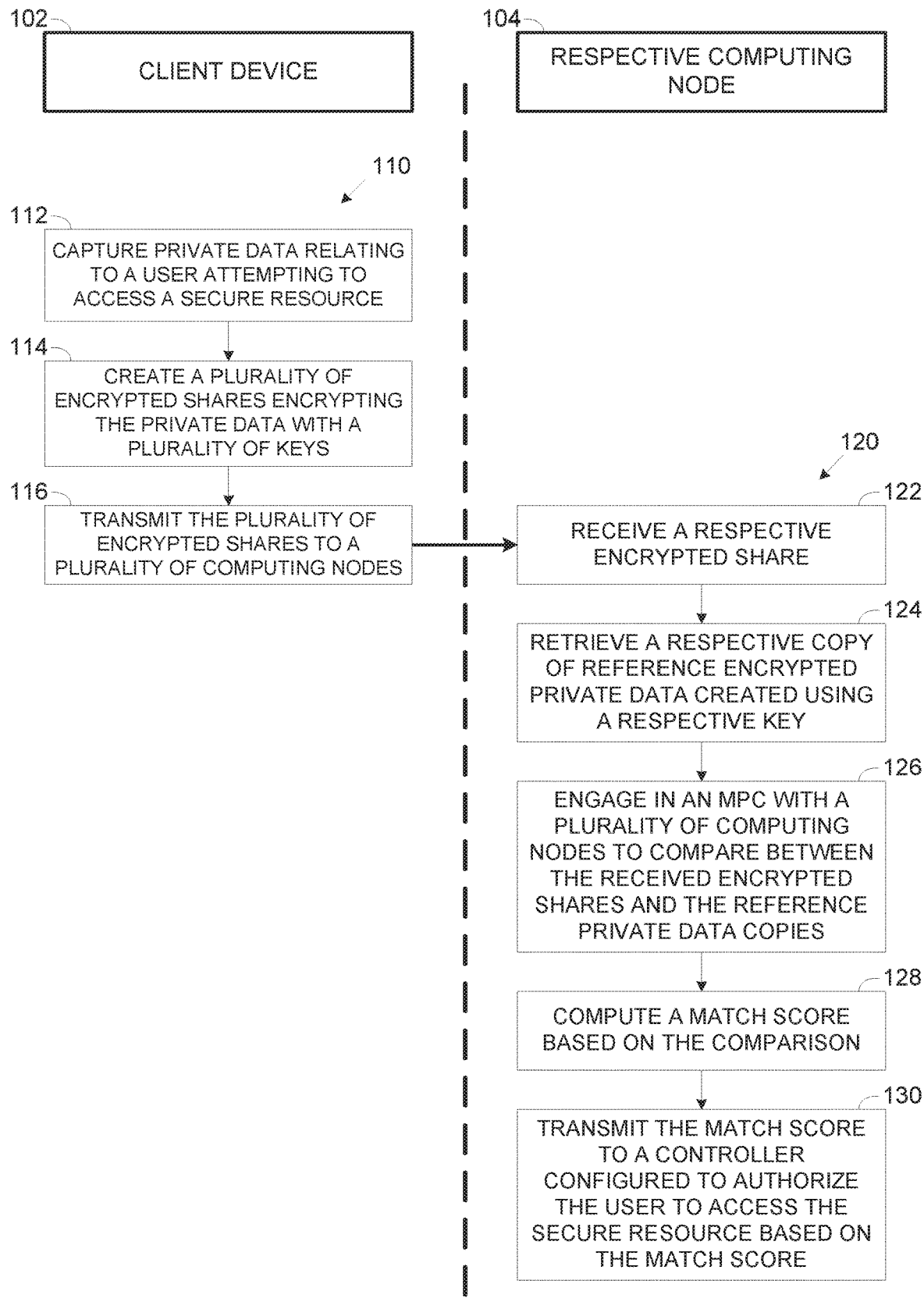
FIG. 1 is a flowchart of an exemplary process of authenticating a user accessing a secure resource by a plurality of computing nodes engaged in an MPC to compare between encrypted private data relating to the user and reference encrypted private data without decrypting the private data, according to some embodiments of the present invention.

The present invention, in some embodiments thereof, relates to authenticating a user accessing a secure resource data, and, more specifically, but not exclusively, to authenticating private data of a user accessing a secure resource data by a plurality of computing nodes engaged in an MPC using an encrypted version of the private data and having no access to the private data content in the clear (unencrypted).

According to some embodiments of the present invention, there are provided methods, systems, devices and computer program products for authenticating a user using a client device to access one or more secure resources based on an authentication session conducted by a plurality of computing nodes which engage in one or more secure MPC sessions to compare between private data relating to the user and/or to the client device and respective reference private data recorded, logged and/or stored for the user. In particular, the computing nodes which are associated with the secure resource may engage in the secure MPC using only encrypted versions of the private data such that the computing nodes have no access to the content of the private data to prevent publicly exposing the private data and thus ensure security and privacy of the private data.

The user may typically access the secure resource, for example, a private network, a secure network node, a secure storage (e.g. database), a secure service, a secure platform, a cryptocurrency service and/or the like via a network (e.g. the internet) using a client device, for example, a computer, a laptop, a server, a mobile device, a Smartphone, a tablet and/or the like.

While the user attempts to access the secure resource, the client device may capture private data relating to the user and/or the client device. The private data relating to the user may include identification and/or authentication information required to authenticate the user, for example, user identification (ID), name, residential address, billing address, access credentials such as for example, an account ID, a password, a code, a key, an account ID (e.g. number), biometric data of the user and/or the like. The private data relating to the client device may include, for example, a device ID, a network address and/or the like.

However, the client device related private data may further include one or more attributes, specifically structural attributes of the structure of the client device, specifically a hardware structure, a software structure, a storage structure, and/or the like. The structural attributes may include, for example, a presence, a type, an ID, a version and/or the like of one or more hardware plug-in (add-on) modules installed, attached and/or integrated with the client device, presence, a type, an ID, a version and/or the like of one or more software modules installed in the client device (e.g. Operating System (OS), application, Dynamic-Link Library (DLL), device driver, browser cookie, etc.), a folder structural layout of the storage of the client device, one or more activity log files, a content of one or more files and/or the like.

The client device may create a plurality of encrypted shares by encrypting the captured private data using a plurality of keys, specifically cryptographic encryption keys as known in the art such as, for example, a symmetric key, an asymmetric key and/or the like such that each of the encrypted shares is created using a respective one of the plurality of keys. Moreover, each of the plurality of keys is associated with a respective one of the plurality of computing nodes configured to engage in the secure MPC session(s) to authenticate the user, specifically the private data relating to the user and/or to the client device.

The client device may further transmit, via one or more networks, the plurality of encrypted shares to the plurality of computing nodes associated with the secure resource and configured to authenticate the user before granting him access to the secure resource. After transmitting the encrypted shares, the client device may discard (delete, erase, remove) the encrypted shares. Moreover, the client device may use only volatile memory for capturing and processing the private data and for creating the encrypted shares such that the private data is never persistently stored in the client device.

In particular, each of the computing nodes is associated with a respective one of the keys and the client device may transmit each encrypted share created using a respective key to the respective computing node associated with the same respective key. It should be noted that the computing nodes do not have the keys and are incapable of decrypting the encrypted shares and hence incapable of accessing the private data content thus ensuring privacy and security of the private data.

The plurality of computing nodes may compare between the plurality of encrypted shares comparing the captured private data and a plurality of reference encrypted private data copies comprising the private data in encrypted form. Specifically, each of the reference encrypted private data copies is associated with a respective one of the plurality of computing nodes and is encrypted using the respective key associated with the respective computing node.

To accomplish the comparison without decrypting the encrypted shares to extract the private data, the computing nodes may engage in one or more secure MPC sessions according to one or more MPC protocols, algorithms and/or methods as known in the art which allow processing encrypted data in a secure manner without decrypting the private data and compromising its content. The computing nodes may therefore engage in one or more MPC sessions to compare between the encrypted shares and the reference encrypted private data copies. Specifically, each of the computing nodes may engage in the secure MPC using its respective encrypted share and its respective reference encrypted private data copy. Optionally, one or more of the MPC protocols, for example, a threshold MPC protocol may define that only a subset of the computing nodes may engage in the MPC session(s) to correctly compare between the encrypted shares and the reference encrypted private data copies. The minimum number of computing nodes of the subset may be defined by the respective threshold MPC protocol.

Based on a result of the comparison, the computing nodes may compute a match score indicative of the similarity between encrypted shares and the reference encrypted private data copies. The match score may be therefore highly indicative of the matching (e.g., compliance, similarity, relationship, correlation, etc.) between the private data captured by the client device (encrypted in the encrypted shares) and the reference private data (encrypted in the reference encrypted private data copies). As such, a high match score may indicate that the captured private data is very similar to the reference private data stored in encrypted form in the reference encrypted private data copies meaning that it is highly likely that user and/or the client device used by the user correctly correspond to a respective user and respective client device recorded in the reference private data. In contrast, a low match score may indicate that the captured private data is at least partially dissimilar to the reference private data which may indicate that the user and/or the client device may slightly correspond to a respective user and client device recorded in the reference private data and potentially do not correspond to any recorded user and/or client device.

The computing nodes, for example, a master computing node of the plurality of computing nodes may transmit the match score to one or more controllers configured to control access of users to the secure resource, specifically, the controller may be configured to grant and/or deny the user access to the secure resource. The controller may further control the access of the user to the secure resource in terms of access rights, privileges, actions, operations (e.g. read, write, alter, upload, download, etc.) and/or the like. For example, the controller may compare between the match score and one or more thresholds, for example, a predefined threshold. The controller may therefore grant the user access to the secure resource in case the computed match score exceeds the threshold(s) and deny the user access to the secure resource in case the match score does not exceed the threshold(s). Moreover, the controller may grant the user access to the secure resource but may adjust the access rights and privileges according to the match score.

Optionally, the computing nodes, for example, the master computing node may transmit one or more data requests to the client device instructing the client device to include one or more requested private data items in the captured private data encrypted in the encrypted shares.

Optionally, in case the match score computed for the user does not exceed one or more of the threshold(s), the computing nodes, for example, the master computing node may transmit to the client device one or more additional data requests instructing the client device to include one or more additional private data items in the captured private data encrypted in the encrypted shares.

The MPC based authentication, in which the user is authenticated by the plurality of computing nodes engaging in a secure MPC to compare between the captured private data and the reference private data which are only exposed in the encrypted form, may present major benefits and advantages compared to existing methods and systems authenticating users.

First, some of the existing methods may compare between the private data received from the client device and reference private data relating to the users and/or to the client device while the private data is not encrypted and the private data may be therefore compromised by one or more malicious attacks and/or it may be publicly exposed. In contrast, with the MPC based authentication, since the private data shared with the computing nodes for the comparison through the secure MPC session(s) is encrypted and the computing nodes have no access to the encryption keys, security and privacy of the private data is significantly increased. The MPC based authentication may be therefore applied to a plurality of applications, services, platform and/or systems in which the user attempting to access the secure resource needs to be first authenticated based on his related private data while ensuring that the private data used to authenticate the user is not publicly exposed.

Moreover, since the private data is never persistently stored in non-encrypted form, security and privacy of the private data may be further increased.

Furthermore, the private data which is compared between captured private data and the respective reference private data may include a plurality of private data items relating to the users and/or the client device he uses. It may therefore be highly difficult for a potential malicious party attempting to fraudulently access the secure resource by initiating as a legitimate user to provide a complete set of the private data items which significantly comply with the real private data of the legitimate user as recorded in the reference private data (encrypted in the reference encrypted private data copies). This may significantly increase immunity of the secure resource to malicious access attempts.

In addition, some of the existing methods may authenticate the user and his client device based on one or more attributes, parameters and/or characteristics of the user and/or of the client device which are time dependent, geographical location dependent and/or the like. For example, when accessing the secure resource via the network at different times of the data, week and/or the like and/or from different geographical regions, the network address (e.g. the IP address) assigned to the client device may change. Therefore, the existing systems which may authenticate the user based on, for example, the network address of the client device may erroneously fail to authenticate the client device when assigned a different network address than the one recorded in the reference private data. This limitation is overcome by the MPC based authentication since the private data comprises a plurality of structural attributes of the client device which do not depend on time, geographical location and/or the like. As such, the user and his client device may be successfully authenticated even when accessing the secure resource at different times and/or from different geographical regions.

Also, some of the existing methods may compare an encrypted version of a predefined set of attributes of the private data of the user, for example, compare a hash value computed for the private data. However, such a comparison may yield a "yes" or "no" result offering no granularity and may be thus unable to provide an indication of the compliance level between the captured private data and the reference private data, i.e. an indication of how similar the two are. Hence for example, assuming a user's reference private data includes a word document called "tasks for this week" which contains 3,021 words. Further assuming the document was recently edited to have a later date, an adjusted title 'tasks for this week final" and contains 3130 words and is therefore slightly different in the captured private data. Comparing between the hash computed for the captured private data and the hash computed for the reference private data may result in a no match even though the two documents may be mostly identical. On the other hand, applying the match score computed using the MPC based authentication may allow implementation of flexible comparisons with regular expressions, statistical correlations and/or the like thus yielding a non-zero match score between the original and edited/changed documents, indicating that while not identical, the two documents may be similar to some extent.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of authenticating a user accessing a secure resource by a plurality of computing nodes engaged in an MPC to compare between encrypted private data relating to the user and reference encrypted private data without decrypting the private data, according to some embodiments of the present invention.

An exemplary process 110 may be executed by a client device 102 used by a respective user for accessing one or more secure resources. A complementary exemplary process 120 may be executed by each of a plurality of networked computing nodes 104 engaged to authenticate the user by engaging in a secure MPC to compare between private data relating to the user and/or to the client device 102 used by the user and reference private data relating to the user. In particular, the plurality of computing nodes 104 engage in the secure MPC to compare between an encrypted version of the private data and encrypted copies of the reference private data such that none of the computing nodes 104 has access to the private data itself, i.e. to the private data in decrypted form.

Figure 2:
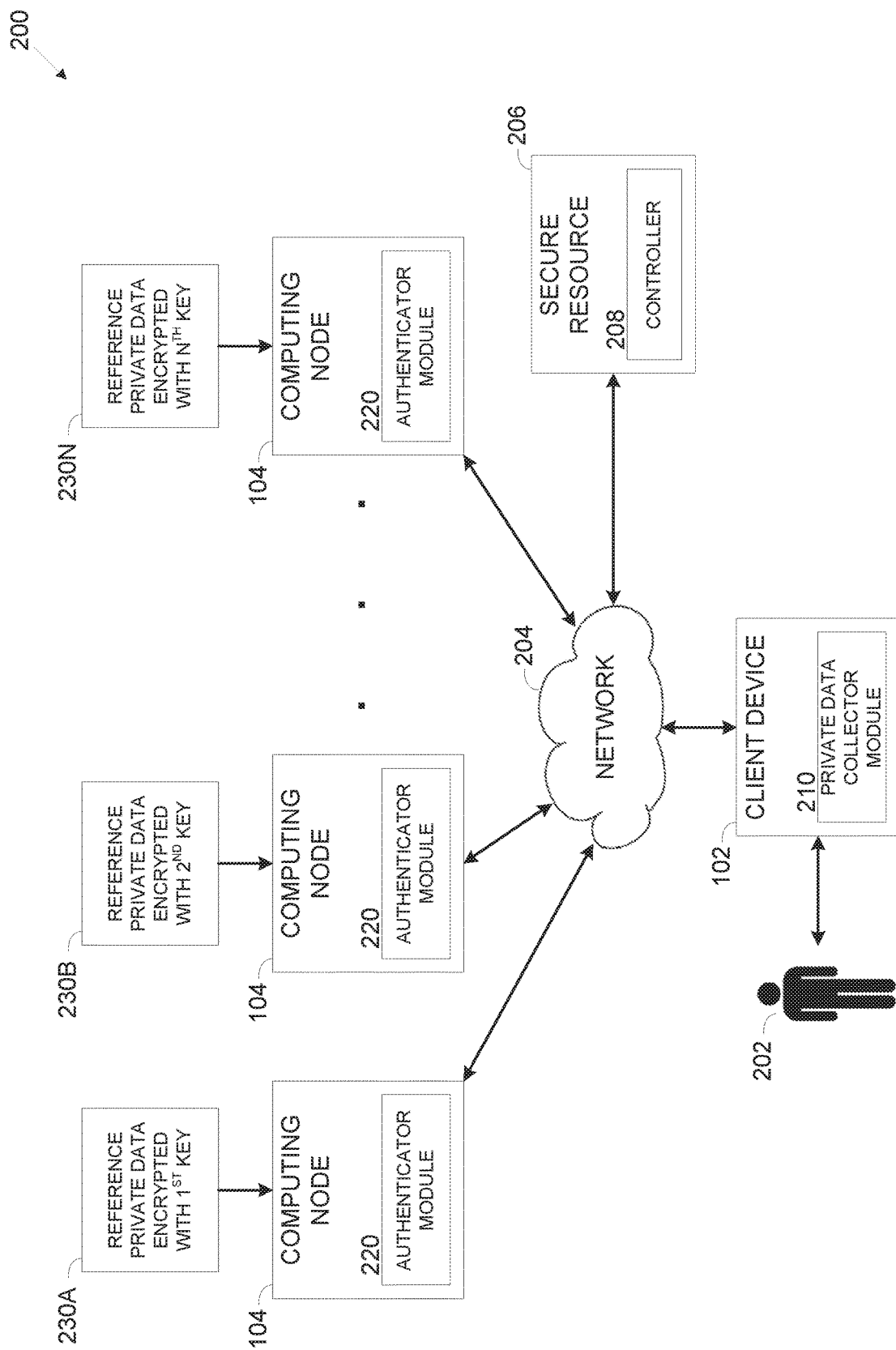
FIG. 2 is a schematic illustration of an exemplary system for authenticating a user accessing a secure resource by a plurality of computing nodes engaged in an MPC to compare between encrypted private data relating to the user and reference encrypted private data without decrypting the private data, according to some embodiments of the present invention.

Reference is also made to FIG. 2, which is a schematic illustration of an exemplary system for authenticating a user accessing a secure resource by a plurality of computing nodes engaged in an MPC to compare between encrypted private data relating to the user and reference encrypted private data without decrypting the private data, according to some embodiments of the present invention.

An exemplary system 200 may include a client device such as the client device 102, for example, a server used by a user 202 for accessing one or more secure resources 206, for example, a private network, a secure network node, a secure storage (e.g. database), a secure service, a secure platform, a cryptocurrency service and/or the like.

In particular, the user 202 may use the client device 102 to access one or more of the secure resources 206 which are networked resources accessible via a network 204 comprising one or more wired and/or wireless networks, for example, a Local Area Network (LAN), a Wireless LAN (WLAN), a Wide Area Network (WAN), a Municipal Area Network (MAN), a cellular network, the internet and/or the like.

One or more controllers 208 may control access of one or more users such as the user 202 to the secure resource 206, specifically, the controller 208 may grant and/or deny access of the user 202 to the secure resource 206. The controller 208 may further control the access of the user 202 to the secure resource 206 in terms of access rights, privileges, actions, operations and/or the like collectively designated access rights herein after. The access rights may define for one or more users 202, for example, secure data and/or secure resources that the respective user 202 is authorized to access. In another example, the access rights may define for one or more users 202 the privileges, actions and/or operations that the respective user 202 is authorized to do, for example, read, write, alter, upload, download and/or the like.

The controller 208 may authorize the access of the user 202 to the secure resource 206 based on authentication of the user 202 by a plurality of networked computing nodes such as the networked computing node 104 connected to the network 204 and capable of communicating with each other as well as with the client device 202 and the controller 208 via the network 204. In particular, the plurality of computing modes 104 may form a community relating to a certain entity, service and/or platform, for example, a company, a service, a cryptocurrency service and/or the like such that the computing nodes are configured to authenticate the user 202 attempting to access the secure resource 206 which is associated and/or related to the certain entity, service and/or platform. Optionally, a master computing node 104 of the plurality of computing modes 104 may control orchestration of at least part of the authentication process, for example, communicate with the controller 208, communicate with the client device 202, monitor, identify and/or control the operation of other computing nodes 104 and/or the like.

The computing nodes 104 may authenticate the user 202 based on authentication of private data relating to the user 202 compared to respective reference private data stored for the user 202. While the private data is required for authenticating the user 202, in order to ensure, maintain and verify its privacy and security, the private data must not be exposed to the computing nodes 104.

The client device 102 may therefore execute a private data collector functional module 210 for collecting the private data relating to the user 202 attempting to access the secure resource 206, for encrypting the private data and for transmitting the encrypted private data to the computing nodes 104.

Each of the computing nodes 104 may have access to a respective associated one of a plurality of copies of reference private data 230 relating to the user 202. The reference private data copies 230 may include private data relating to allowed and/or authorized users such as the user 202 which are allowed and authorized to access the secure resource 206.

Each reference encrypted private data copy 230 may be stored in one or more storage resources accessible to the associated respective computing node 104, for example, a local storage resource of the respective computing node 104 (e.g. memory, hard drive, Flash array, etc.), a network resource (e.g. a server, a database, etc.).

However, since the private included in the data reference encrypted private data 230 may comprise private, sensitive and/or confidential information relating to the user 202, the reference encrypted private data copies are encrypted with keys, specifically, cryptographic encryption keys as known in the art such as, for example, a symmetric key, an asymmetric key and/or the like which are not available and hence unknown to the computing nodes 104. Since the computing nodes 104 do not have access to the keys and are incapable of decrypting the private data, the computing nodes 104 are therefore unable to access the private data and thus privacy and security of the private data is ensured.

Moreover, each of the reference encrypted private data copies may be encrypted using a respective (different) one of the encryption keys such that a first reference encrypted private data copy 230A associated with a first computing node 104 may be encrypted with a first ($1^{st}$) key, a second reference encrypted private data copy 230B associated with a second computing node 104 may be encrypted with a second ($2^{nd}$) key and so on to an $N^{th}$ reference encrypted private data copy 230N associated with an $N^{th}$ computing node 104 may be encrypted with an $N^{th}$ key. As such each of the plurality of computing nodes 104 is also associated with a respective one of the plurality of encryption keys which is used to encrypt its respective reference private data copy.

To accomplish the authentication of the user 202 based on authenticating his related private data without decrypting the captured private data encrypted by the client device 102 as well as the encrypted reference private data copies, the plurality of computing nodes 104 may engage in one or more secure MPC sessions to compare the encrypted captured private data to the reference encrypted private data copies and compute a match score based on the comparison. To this end, each of the computing noes 104 may execute an authenticator functional module 220.

Figure 3:
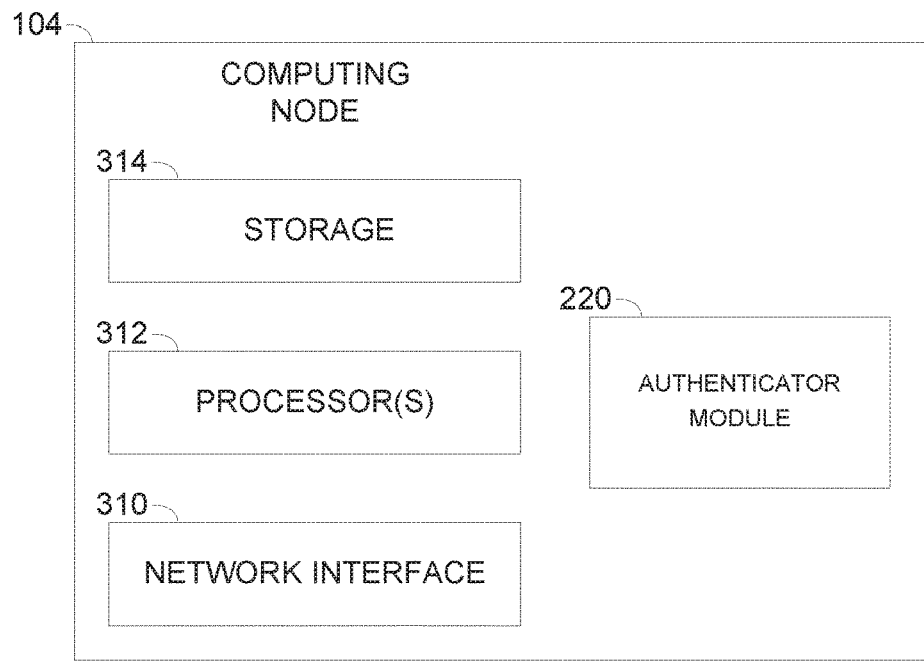
FIG. 3 is a schematic illustration of an exemplary computing node and an exemplary client device system used for authenticating a user accessing a secure resource by a plurality of computing nodes engaged in an MPC to compare between encrypted private data relating to the user and reference encrypted private data without decrypting the private data, according to some embodiments of the present invention.
Figure 3:
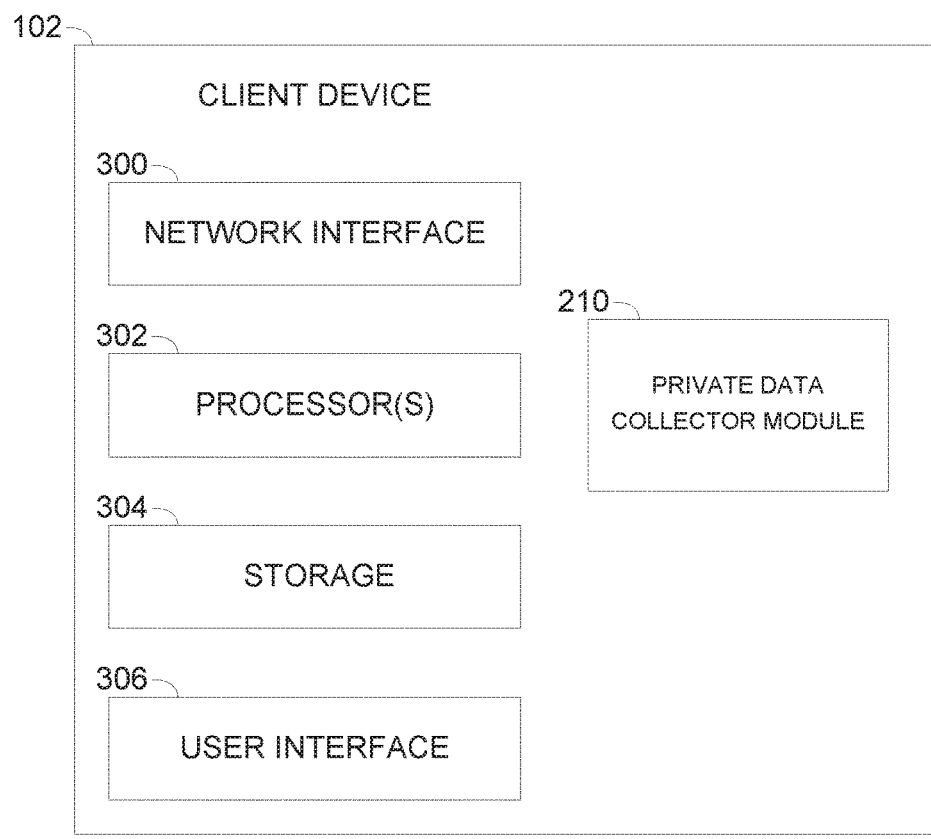

Reference is now made to FIG. 3, which is a schematic illustration of an exemplary computing node and an exemplary client device system used for authenticating a user accessing a secure resource by a plurality of computing nodes engaged in an MPC to compare between encrypted private data relating to the user and reference encrypted private data without decrypting the private data, according to some embodiments of the present invention.

A client device such as the client device 102, for example, a computer, a laptop, a server, a mobile device, a Smartphone, a tablet and/or the like may include a network interface 300 for connecting to a network such as the network 204, a processor(s) 302 for executing a process such as the process 110, a storage 304 and a user interface 306 for interacting with a respective user such as the user 202.

The network interface 300 may include one or more wired and/or wireless interfaces, for connecting to the network 204 and enable the user 202 to access the secure resource 206 via the network 204. The processor(s) 302, homogenous or heterogeneous, may include one or more processing nodes arranged for parallel processing, as clusters and/or as one or more multi core processor(s). The storage 304 may include one or more non-transitory memory devices, either persistent non-volatile devices, for example, a ROM, a Flash array, a hard drive and/or the like and/or one or more volatile devices, for example, a RAM device, a cache memory and/or the like.

The processor(s) 302 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 304 and executed by one or more processors such as the processor(s) 302. The processor(s) 302 may further include, utilize and/or otherwise facilitate one or more hardware modules (elements), for example, a circuit, a component, an Integrated Circuit (IC), an Application Specific Integrated Circuit (ASIC), a Field Programmable Gate Array (FPGA), a Digital Signals Processor (DSP), a Graphic Processing Units (GPU) and/or the like.

The client device 202, specially the processor(s) 302 may therefore execute one or more functional modules utilized by one or more software modules, one or more of the hardware modules and/or a combination thereof. For example, the client device 202 may execute a private data collector functional module such as the private data collector functional module 210 for executing the process 110 for capturing the private data relating to the user 202, encrypting it and transmitting the encrypted private data to a plurality of computing nodes such as the computing node 104.

The user interface 306 may include one or more Human-Machine Interfaces (HMI) interfaces for interacting with the user 202, for example, a keyboard, a touchpad, a pointing device, a touchscreen, a screen, a speaker, an earphone, a microphone and/or the like.

One or more of a plurality of computing nodes such as the computing nodes 104 may be utilized by a physical computing device, for example, a computer, a server, a processing node, a cluster of computing nodes and/or any other device, system and/or apparatus comprising one or more processing units. The computing node 104 may include a network interface 310 such as the network interface 302 for connecting to the network 204, a processor(s) 312 such as the processor(s) 304 for executing a process such as the process 120 and a storage 314 such as the storage 304. Optionally, the storage 314 further includes one or more networked storage resources, for example, a server, a Network Attached Storage (NAS) and/or the like.

The processor(s) 312 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 314 and executed by one or more processors such as the processor(s) 312. The processor(s) 312 may further include, utilize and/or otherwise facilitate one or more hardware modules (elements), for example, a circuit, a component, an Integrated Circuit (IC), an Application Specific Integrated Circuit (ASIC), a Field Programmable Gate Array (FPGA), a Digital Signals Processor (DSP), a Graphic Processing Units (GPU) and/or the like.

Optionally, one or more of the plurality of computing nodes 104 may utilized by a Virtual Machine (VM) instantiated over one or more physical computing devices. Moreover, one or more of the computing nodes 104 may be optionally implemented using one or more cloud computing services, platforms and/or applications, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

Each of the computing nodes 104 may therefore execute one or more functional modules utilized by one or more software modules, one or more of the hardware modules and/or a combination thereof. For example, the computing node 104 may execute an authenticator functional module such as the authenticator functional module 220 for executing the process 120 for engaging in the secure MPC to compare between the encrypted private data received from the client device 202 and the reference encrypted private data copies to compute the match score which may be used for authenticating the user 202.

The system 200 and the processes 110 and 120 are presented for a single client device 102 used by a single user 202 to access a single secure resource 206 controlled by a single controller 208. This however, should not be construed as limiting, since the system 200 may be expanded such that the community of computing nodes 104 may authenticate a plurality of users such as the user 202 each using a respective client device(s) 202 to access one or more of a plurality of secure resources such as the secure resource 206 controlled by one or more controllers such as the controller 208.

As shown at 112, the process 110 starts with the client device 102 capturing private data relating to the user 202 who uses the client device 102 to access the secure resource 206 via the network 204 and/or to the client device 202 itself.

The private data relating to the user 202 may typically include information required to authenticate the user 202. The private data may therefore include identification (ID) information of the user 202, for example, user ID, account ID, name, residential address, billing address and/or the like. The private data may also include authentication information valid for the user 202, for example, credentials of the user 202 which are applicable for accessing the secure resource 206, for example, a password, a code, a key, an account ID (e.g. number) and/or the like.

The private data relating to the client device 102 may typically include identification information of the client device 102, for example, a device ID (e.g., a model number, a serial number, a MAC address, etc.), a network address (e.g. an IP address, etc.). However, the private data relating to the client device 102 may further include one or more structural attributes of the structure of the client device 102 which may include, for example, a hardware structure, a software structure, a storage structure and/or the like. In particular, the structural attributes may relate to dynamic and/or configurable elements of the hardware, software and/or storage structures. The structural attributes may therefore be specific to each client device 102 in particular in combination such that a combination of the structural attributes of a certain client device 102 may differentiate the certain client device 102 from other client devices 102 which may be identical in at least some of the identification information, for example, the model number, the network address and/or the like.

The attributes of the hardware structure of the client device 102 may include, for example, an indication of a presence, a type, an ID, a version and/or the like of one or more hardware plug-in (add-on) modules installed, attached and/or integrated with the client device 102. Such hardware plug-in modules may include, for example, a dongle such as, for example, one or more Universal Serial Bus (USB) dongles, one or more expansion cards such as, for example, a Peripheral Component Interconnect (PCI) card, one or more attachable devices connected to one or more ports and/or interfaces of the client device 102, for example, an external mass storage drive connected to a USB port, a network port and/or the like of the client device 102 and/or the like.

The attributes of the software structure of the client device 102 may include, for example, an indication of a presence, a type, an ID, a version and/or the like of one or more software modules installed in the client device 102. Such software modules may include, for example, an Operating System (OS), one or more applications, one or more Dynamic-Link Library (DLL), one or more device drivers, one or more browser cookies, one or more software patches and/or the like.

The attributes of the storage structure of the client device 102 may include, for example, a folder structural layout of at least some of the folders stored in the client device 102, one or more log files logging activity at the client device 102, a content of one or more files stored in the client device 102 and/or the like.

As shown at 114, the client device 102 may create a plurality of encrypted shares of the private data where each of the encrypted shares is created by encrypting the private data using a respective one of a plurality of keys, i.e., cryptographic encryption keys. In particular, the client device 102 may create each of the plurality of encrypted shares using a respective on of the plurality of keys associated with a respective one of the plurality of computing nodes 104 of the community.

For example, assuming there are four computing nodes 104 each associated with a respective unique key a, b, c and d which may be, for example, a randomly generated strings. In such case, the client device 102 may create four encrypted shares by encrypting the private data using each of the four unique strings a, b, c and d. For example, assuming the private data is designated M, the client device may encrypt the private data, for example, apply a XOR operation on the private data M with each of the random strings a, b, c and d to create four bit sets Ma, Mb, Mc and Md respectively which may serve as the encrypted shares.

As shown at 116, the client device 102 may transmit the plurality of encrypted shares to the plurality of computing nodes 104. In particular, the client device 102 transmits each encrypted share created using a respective key to a respective computing node 104 which is associated with the same respective key.

Moreover, after transmitting the encrypted shares to the computing nodes 104, the client device 102 may discard, for example, deleted, erase and/or otherwise remove the encrypted shares from its local memory. Furthermore, the client device 102 may compute and create the encrypted shares using only its volatile memory resources (available in storage 304) such that the encrypted shares are only temporarily available at the client device 102 and are never stored in persistent memory (available in storage 304) of the client device 102.

Optionally, the master computing node 104 may transmit one or more data requests to the client device 102 to instruct the client device 102 to respond with one or more private data items defined and requested by the data request(s). In particular, the data request(s) may instruct the client device 102 to capture the requested private data items and include them in the encrypted shares created and transmitted to the plurality of computing nodes 104. The client device 102 may therefore capture the requested private data item(s) optionally together with one or more additional private data items (not defined by the data request(s)) and create the plurality of encrypted shares encrypting the captured private data including the requested private data item(s).

As shown at 122, the process 120 executed by each of at least some of the plurality of computing nodes 104 starts with each of the respective computing node 104 receiving a respective one of the plurality of encrypted shares from the client device 102. Specifically, as stated herein before, each computing node 104 may receive a respective encrypted share create suing a respective one of the plurality of encryption keys associated with the respective computing node 104.

As shown at 124, each of the computing nodes 104 may retrieve a respective one of the plurality of reference encrypted private data copy 230, specifically a respective reference encrypted private data copy 230 comprising private data relating to the (specific) user 202 and/or to the (specific) client device 102.

As shown at 126, the plurality of computing nodes 104 may engage in one or more secure MPC sessions using one or more MPC protocols as known in the art to compare between the encrypted shares and the reference encrypted private data copy 230 in a secure manner such that the privacy and security of the private data are not compromised. Specifically, the plurality of computing nodes 104 may engage in the secure MPC where each computing node 104 uses its respective received encrypted share and its respective reference encrypted private data copy 230.

Some MPC protocols as known in the art may require that all of the computing nodes 104 of the community execute the process 120 and participate in the secure MPC session(s) for comparing the encrypted shares with the reference encrypted private data copies 230.

However, some MPC protocol(s) as known in the art, for example, one or more threshold MPC protocols such as, for example, threshold secret sharing algorithm, threshold multi-signature protocol and/or the like may require only a subset of the computing nodes 104 to participate in the secure MPC session(s). The threshold MPC protocol(s) may define the subset to include a minimum number of the computing nodes 104 which is sufficient for accurately and reliably comparing between their respective encrypted shares and their respective reference encrypted private data copies 230.

Therefore, optionally, only a subset of the computing nodes 104 may execute the process 120 and participate in the secure MPC session(s) to compare between the encrypted shares and the reference encrypted private data copies 230. As such, assuming there are n computing nodes 204, the threshold MPC protocol(s) may define the subset to include a minimum number m of the n computing nodes 104 ($2 \leq m \leq n$) which is sufficient to compare between their respective encrypted shares and their respective reference encrypted private data copies 230. For example, n=10, the MPC protocol used by the computing nodes 104, for example, Shamir's secret sharing algorithm may define that a subset comprising any 7 (m=7) computing nodes 104 out of the total of 10 computing nodes 204 is sufficient to reliably compare between their respective encrypted shares and their respective reference encrypted private data copies 230.

Optionally, the master computing node 104 orchestrates one or more aspects of one or more of the secure MPC session(s), for example, monitor the MPC session to identify one or more non-responding computing nodes 104 which fail to participate in the MPC session according to the MPC protocol, for example, respond within a predefined time period, respond according to the MPC protocol, and/or the like.

As shown at 128, the computing nodes 104 may compute a match score for a result of the comparison conducted through the secure MPC session(s).

The match score may be indicative of the match identified by the computing nodes 104 between the encrypted shares and the reference encrypted private data copies 230. The match score may therefore translate to the matching, for example, compliance, similarity, relationship, correlation and/or the like between the private data captured by the client device (step 112 of the process 110) which is encrypted in the encrypted shares and the reference private data encrypted in the reference encrypted private data copies 230.

Since the private data relating to the user 202 and/or to the client device 102 may include one or more of the dynamic and/or configurable structural attributes which may change over time, the captured private data may not be identical with the reference private data. For example, assuming that between the time of creating the reference encrypted private data copies 230 one or more structural changes occurred in the client device 102, for example, a cookie was added to a browser installed at the client device 102, a newer version of a DLL was installed in the client device 102, a new dongle was attached to the client device 102 and/or the like. In such case the captured private and the reference private data may not be identical. However, an overall combination of the structural attributes values which should not significantly vary over time may be highly indicative of whether the client device 102 as depicted by the captured private data is the same client device 102 described by reference private data.

The match score may be therefore indicative of the similarity level identified between the captured private data describing the user 202 and the client device 102 used to access the secure resource 206 and the reference private data describing a respective authorized user using a known and previously documented client device 102. As such, a high match score may indicate that the captured private data is very similar to the reference private data stored in encrypted form in the reference encrypted private data copies 230 meaning that it is highly likely that user 202 and/or the client device 102 used by the user 202 to access the secure resource 206 correspond to a respective user 202 and client device 102 recorded and stored in the reference private data. In contrast, a low match score may indicate that the captured private data is at least partially dissimilar to the reference private data which may indicate that the user 202 and/or the client device 102 used by the user 202 to access the secure resource 206 slightly correspond to a respective user 202 and client device 102 recorded in the reference private data and potentially do not correspond to any recorded user 202 and/or client device 102.

As shown at 130, the computing nodes 104, for example, the master computing node 104 may transmit the match score to the controller 208 which, based on the match score, may authorize, specifically grant or deny the user 202 access to the secure resource 206. For example, the controller 208 may authorize access of the user 202 to the secure resource 206 based on comparison of the match score to one or more thresholds, for example, a predefined threshold a leaned threshold and/or the like. As such, the controller 208 may grant the user 202 access to the secure resource 206 in case the match score exceeds the threshold(s) and deny access from the user 202 in case match score does not exceed the threshold(s).

Optionally, the controller 208 may adjust the access rights of the use 202 according to the match score. For example, in case the match score computed for the user 202 is high, the controller 208 may grant the user 202 unlimited access rights to the secure resource 206. In another example, in case the match score computed for the user 202 is relatively low, the controller 208 may grant the user 202 limited access rights to the secure resource 206, for example, read only privileges, access to low security data and/or the like.

Optionally, in case the match score does not exceed one or more of the thresholds, one or more additional information requests may be transmitted to the client device 102 instructing the client device 102 to respond with one or more additional private data items. For example, in case the controller 208 determines that the match score does not exceed one or more of the thresholds, the controller 208 may transmit a non-compliance indication (e.g. message, alert, etc.) to the computing nodes 104, for example, to the master computing node 104.

In response to the non-compliance indication, the master computing node 104 may transmit one or more additional information requests to the client device to instruct the client device 102 to respond with one or more additional private data items. In particular, the data request(s) may instruct the client device 102 to capture the additional private data item(s) and include them in the encrypted shares created and transmitted to the plurality of computing nodes 104. The client device 102 may therefore capture the additional private data item(s) optionally together with one or more additional private data items (not defined by the additional data request(s)) and create the plurality of encrypted shares encrypting the captured private data including the additional private data item(s).

The MPC based authentication may be applied to a plurality of applications, services, platform and/or systems in which the user 202 attempting to access a secure resource 206 may need to be first authenticated while ensuring that the private data used to authenticate the user 202 is not publicly exposed.

For example, the secure resource 206 may be a networked resource of a private network accessible from a plurality of different geographical regions. Naturally when the user 202 using the client device 102 attempts to access the private network, for example, via the network 204 (e.g. the internet) from different geographical regions in which network connectivity may be served by different access points, gateways and/or the like, some private data items may change depending on the geographical region, for example, the network address assigned to the client device 102. However, other private data items, specifically the structural attributes of the client device 102 or at least part thereof may remain the same irrespective of the geographical region where the client device 102 is located. The computing nodes 104, specifically computing nodes 104 associated with the private network may therefore receive encrypted shares created to encrypt the private data captured by the client device 102 while the user 202 accesses the secure resource 206 and may engage in the secure MPC session(s) to compare between the encrypted shares and the reference encrypted private data copies 230 and compute the match score based on the comparison result.

For example, an employee 202 of certain company which is usually stationed in a first branch of the company located in a first geographical region, for example, a Japan office may visit a second branch of the company located in a second geographical region, for example, a US office. While in the US office, the employee 202 may attempt to login into the company's network using his laptop 102 which is his personal laptop which he typically uses in the Japan office.

The laptop 102 may collect private data relating to the employee 202 and/or to the laptop 102 and may create the plurality of encrypted shares which may be transmitted to the plurality of computing nodes 104 associated with the company. The computing nodes 104 may engage in the secure MPC session(s) to compare between the encrypted shares and the reference encrypted private data copies 230 which may store, in encrypted form, the private data relating to the employee 202 and/or the laptop 102. Based on the comparison, the computing nodes 104 may further compute the match score. Evidently, in case the authentication was based solely on the network address of the laptop 102 which may change between the captured private data (US based network address) and the reference private data (Japan based network address), the comparison may indicate no match and the employee 202 may be assigned a low match score which may cause the controller 208 of the company's network (e.g. firewall) to deny the employed 202 access to the company's network. However, the private data may further include one or more of the structural attributes which may remain the same regardless of the geographical region, for example, laptop ID, software version, file names, folder structure, disk space utilization, File Allocation Table (FAT) and/or the like. In such case, the comparison conducted through the secure MPC session(s) may reveal a high match and accordingly the match score may be significantly high. In such case the employee 202 may be granted access to the company's network even when located in the US. Optionally, as described herein before, in case the match score is insufficiently high, one or more data requests may be transmitted to the laptop 102 instructing the laptop 102 to provide one or more additional private data items.

In another example, the secure resource 206 may be a cryptocurrency service which enables the user 202 to access one or more accounts to withdraw and/or deposit cryptocurrency. Further assuming the user 202 is new to the cryptocurrency service and attempts to access it for the first time. In such case, the computing nodes 104 may be computing nodes 104 associated with one or more financial services, for example, an online banking service, a credit card service, another cryptocurrency service and/or the like to which the user 202 is already registered and thus identifiable since his private data is recorded in a plurality of reference private data copies such as the reference encrypted private data copies 230. The client device 102 used by the user 202 to access the cryptocurrency service may therefore capture the private data relating to user 202 and/or to the client device 102 and may create the plurality of encrypted shares which are transmitted to the plurality of computing nodes 104. The computing nodes 104 may engage in the secure MPC session(s) to compare between the encrypted shares and the reference encrypted private data copies 230 and may compute the match score based on the comparison result. Based on the match score, a controller of the cryptocurrency service such as the controller 208 may grant or deny the user 202 access to the cryptocurrency service. Optionally, as described herein before, the controller 208 may adjust the access rights of the user 202 to the cryptocurrency service based on the match score, for example, limit an amount of cryptocurrency the user 202 is allowed to withdraw and/or deposit and/or the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms MPC protocol and cryptographic key are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for applying Multi-Party Computation (MPC) to authenticate a user accessing a secure resource, comprising:
   a plurality of computing nodes, each comprising a non-transitory program store and at least one hardware processor for executing code stored on said non-transitory program store, said plurality of computing nodes are configured to:
      receive, via at least one network, a plurality of encrypted shares, wherein each encrypted share is created using a respective one of a plurality of keys to encrypt private data captured by a client device used by a user for accessing a secure resource and sent to a different one of said plurality of computing nodes, each of the plurality of computing nodes receives a respective one of the plurality of encrypted shares, the private data comprising data relating to the user and/or the client device;
      engage in a secure MPC to conduct a plurality of comparisons, each compares between a respective encrypted share and a respective reference encrypted private data copy of a plurality of reference encrypted private data copies which are each encrypted using a respective one of the plurality of keys and associated with a respective one of the plurality of computing nodes, wherein the plurality of keys are not available to the computing nodes and wherein said plurality of comparisons are conducted without decrypting said plurality of encrypted shares and without decrypting said plurality of reference encrypted private data copies;
      compute a match score based on the plurality of comparisons; and
      transmit the match score to a controller of the secure resource configured to grant or deny access of the client device to the secure resource based on the match score.

2. The system of claim 1, wherein the controller of the secure resource is configured to grant or deny access of the client device to the secure resource based on comparison of the match score to at least one threshold.

3. The system of claim 1, further comprising the controller of the secure resource is configured to adjust access rights of the client device to the secure resource according to the match score.

4. The system of claim 1, further comprising a master computing node of the plurality of computing nodes transmits to the client device a data request instructing the client device to respond with at least one private data item defined by the data request.

5. The system of claim 1, further comprising, in case the match score does not exceed at least one threshold, transmitting an additional information request to the client device instructing the client device to respond with at least one additional private data item.

6. The system of claim 1, wherein the private data relating to the user comprises authentication data of the user.

7. The system of claim 1, wherein the private data relating to the client device comprises at least one attribute of a structure of the client device, the structure comprising at least one member of a group consisting of: a hardware structure, a software structure and a storage structure.

8. The system of claim 1, wherein the secure resource is a networked resource of a private network accessible from a plurality of different geographical regions, wherein the plurality of computing nodes configured to compute the match score used to authorize access of the client device to the private network are computing nodes associated with the private network.

9. The system of claim 1, wherein the secure resource is a cryptocurrency service, wherein the plurality of computing nodes configured to compute the match score used to authorize access of the client device to the to the cryptocurrency service are computing nodes associated with at least one financial service.

10. The system of claim 1, wherein said authentication data of the user comprising at least one member of a group consisting of: a user identification (ID), a name, a residential address, a billing address, an account ID, a password, a code, a key, an account ID, and biometric data of the user.

11. The system of claim 1, wherein the private data relating to the client device comprises at least one of a device ID and a network address.

12. A method of applying Multi-Party Computation (MPC) to authenticate a user accessing a secure resource, comprising:
   using a plurality of computing nodes configured for:
      receiving, via at least one network, a plurality of encrypted shares, wherein each encrypted share is created using a respective one of a plurality of keys to encrypt private data captured by a client device used by a user for accessing a secure resource and sent to a different one of said plurality of computing nodes, each of the plurality of computing nodes receives a respective one of the plurality of encrypted shares, the private data comprising data relating to the user and/or the client device;
      engaging in a secure MPC to conduct a plurality of comparisons, each compares between a respective encrypted share and a respective reference encrypted private data copy of a plurality of reference private data copies which are each encrypted using a respective one of the plurality of keys and associated with a respective one of the plurality of computing nodes, wherein the plurality of keys are not available to the computing nodes and wherein said plurality of comparisons are conducted without decrypting said plurality of encrypted shares and without decrypting said plurality of reference encrypted private data copies;

computing a match score based on the plurality of comparisons; and transmitting the match score to a controller of the secure resource configured to grant or deny access of the client device to the secure resource based on the match score.

13. A client device for applying Multi-Party Computation (MPC) to authenticate a user accessing a secure resource, comprising:

at least one processor of a client device used by a user for accessing a secure resource, the at least one processor is configured to execute a code, the code comprising:

code instructions to capture private data comprising data relating to the user and/or the client device;

code instructions to create a plurality of encrypted shares each created using a respective one of a plurality of keys to encrypt the captured private data; and code instructions to transmit, via at least one network, the plurality of encrypted shares to a plurality of computing nodes such that each of said plurality of computing nodes receives a respective share encrypted with a key associated with said respective computing node, said plurality of computing nodes engage in a secure MPC to conduct a plurality of comparisons, each compares between a respective encrypted share and a respective reference encrypted private data copy of a plurality of reference encrypted private data copies, without decrypting the respective encrypted share and the respective reference encrypted private data copy and compute a match score based on the plurality of comparisons, each of the plurality of reference private data copies is encrypted using a respective one of the plurality of keys and associated with a respective one of the plurality of computing nodes, wherein a controller of the secure resource is configured to grant or deny the client device access to the secure resource based on the match score.

14. The client device of claim 13, wherein the code further comprising code instructions to discard the plurality of encrypted shares after transmitted to the plurality of computing nodes.

15. A method of applying Multi-Party Computation (MPC) to authenticate a user accessing a secure resource, comprising:

using at least one processor of a client device used by a user for accessing a secure resource, the at least one processor is used for:

capturing private data comprising data relating to the user and/or the client device;

creating a plurality of encrypted shares each created using a respective one of a plurality of keys to encrypt the captured private data; and transmitting, via at least one network, the plurality of encrypted shares to a plurality of computing nodes such that each of said plurality of computing nodes receives a respective share encrypted with a key associated with said respective computing node, said plurality of computing nodes engage in a secure MPC to conduct a plurality of comparisons, each compare between a respective encrypted share and a respective reference encrypted private data copy of a plurality of reference encrypted private data copies, without decrypting the respective encrypted share and the respective reference encrypted private data copy and compute a match score based on the plurality of comparisons, each of the plurality of reference private data copies is encrypted using a respective one of the plurality of keys and associated with a respective one of the plurality of computing nodes, wherein a controller of the secure resource is configured to grant or deny the client device access to the secure resource based on the match score.

* * * * *